US008683403B2

(12) United States Patent
Terabe et al.

(10) Patent No.: US 8,683,403 B2
(45) Date of Patent: Mar. 25, 2014

(54) POWER CIRCUIT ANALYSIS APPARATUS AND METHOD THAT OUTPUTS AN ANALYSIS RESULT FOR SEGMENTED REGIONS OF THE POWER CIRCUIT

(75) Inventors: Miki Terabe, Kawasaki (JP); Yasuo Amano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 13/157,418

(22) Filed: Jun. 10, 2011

(65) Prior Publication Data

US 2011/0313709 A1 Dec. 22, 2011

(30) Foreign Application Priority Data

Jun. 18, 2010 (JP) .................................. 2010-139119

(51) Int. Cl.
*G06F 17/50* (2006.01)

(52) U.S. Cl.
USPC ........... 716/109; 716/100; 716/101; 716/106; 716/132; 716/133; 716/136

(58) Field of Classification Search
USPC .......... 716/100–101, 106, 109, 132–133, 136
See application file for complete search history.

(56) References Cited

U.S. PATENT DOCUMENTS

| | | | | |
|---|---|---|---|---|
| 6,557,154 | B1 * | 4/2003 | Harada et al. ................. | 716/115 |
| 6,643,839 | B1 * | 11/2003 | Nishio et al. .................. | 716/111 |
| 7,168,058 | B2 * | 1/2007 | Harada et al. ................. | 716/112 |
| 7,272,810 | B2 * | 9/2007 | Orita .............................. | 326/80 |
| 7,398,489 | B2 * | 7/2008 | Dinter et al. .................. | 716/115 |
| 7,590,952 | B2 * | 9/2009 | Beattie et al. ................. | 716/106 |
| 7,823,096 | B2 * | 10/2010 | Katagiri et al. ............... | 716/136 |
| 7,984,397 | B2 * | 7/2011 | Lin et al. ....................... | 716/100 |
| 8,015,534 | B2 * | 9/2011 | Kurihara et al. .............. | 716/126 |
| 8,171,446 | B2 * | 5/2012 | Inoue ............................ | 716/127 |
| 8,249,849 | B2 * | 8/2012 | Amano .......................... | 703/14 |
| 2003/0041309 | A1 * | 2/2003 | Chopra et al. ................. | 716/12 |
| 2005/0204316 | A1 * | 9/2005 | Nebel et al. .................... | 716/2 |
| 2006/0218514 | A1 * | 9/2006 | Uchida .......................... | 716/5 |
| 2007/0033553 | A1 * | 2/2007 | Katagiri et al. ................ | 716/4 |
| 2007/0234261 | A1 * | 10/2007 | Nakagawa ..................... | 716/11 |
| 2008/0022233 | A1 * | 1/2008 | Douriet ......................... | 716/1 |

(Continued)

FOREIGN PATENT DOCUMENTS

| | | |
|---|---|---|
| JP | 2005-038400 | 2/2005 |
| JP | 2006-253187 | 9/2006 |
| JP | 2009-289062 | 12/2009 |
| JP | 2010-040661 | 2/2010 |

OTHER PUBLICATIONS

Japanese Office Action mailed Oct. 8, 2013 for corresponding Japanese Application No. 2010-139119, with partial English-language translation.

*Primary Examiner* — Stacy Whitmore
(74) *Attorney, Agent, or Firm* — Fujitsu Patent Center

(57) ABSTRACT

A power circuit analysis apparatus includes a segmentation unit that segments an analysis target region in a power circuit included in an analysis target circuit into a plurality of segmented regions, and an analysis unit that outputs an analysis result of the power circuit with respect to each of the plurality of segmented regions on a basis of a consumption current value in the segmented region and a number of via holes formed in each interlayer connecting power line wirings in upper and lower layers to each other in the segmented region.

18 Claims, 11 Drawing Sheets

(56) References Cited

U.S. PATENT DOCUMENTS

| | | | |
|---|---|---|---|
| 2008/0052649 A1* | 2/2008 | Tai et al. | 716/5 |
| 2008/0066026 A1* | 3/2008 | Tai et al. | 716/4 |
| 2008/0082947 A1* | 4/2008 | Ueda et al. | 716/8 |
| 2008/0127010 A1* | 5/2008 | Beattie et al. | 716/4 |
| 2008/0163138 A1* | 7/2008 | Iwakura et al. | 716/4 |
| 2009/0064066 A1* | 3/2009 | Kurihara et al. | 716/5 |
| 2009/0172618 A1* | 7/2009 | Fujimori et al. | 716/5 |
| 2009/0299718 A1 | 12/2009 | Amano | |
| 2010/0025859 A1* | 2/2010 | Inoue | 257/774 |
| 2010/0190277 A1* | 7/2010 | Lin et al. | 438/17 |
| 2011/0321000 A1* | 12/2011 | Fujimori | 716/136 |

\* cited by examiner

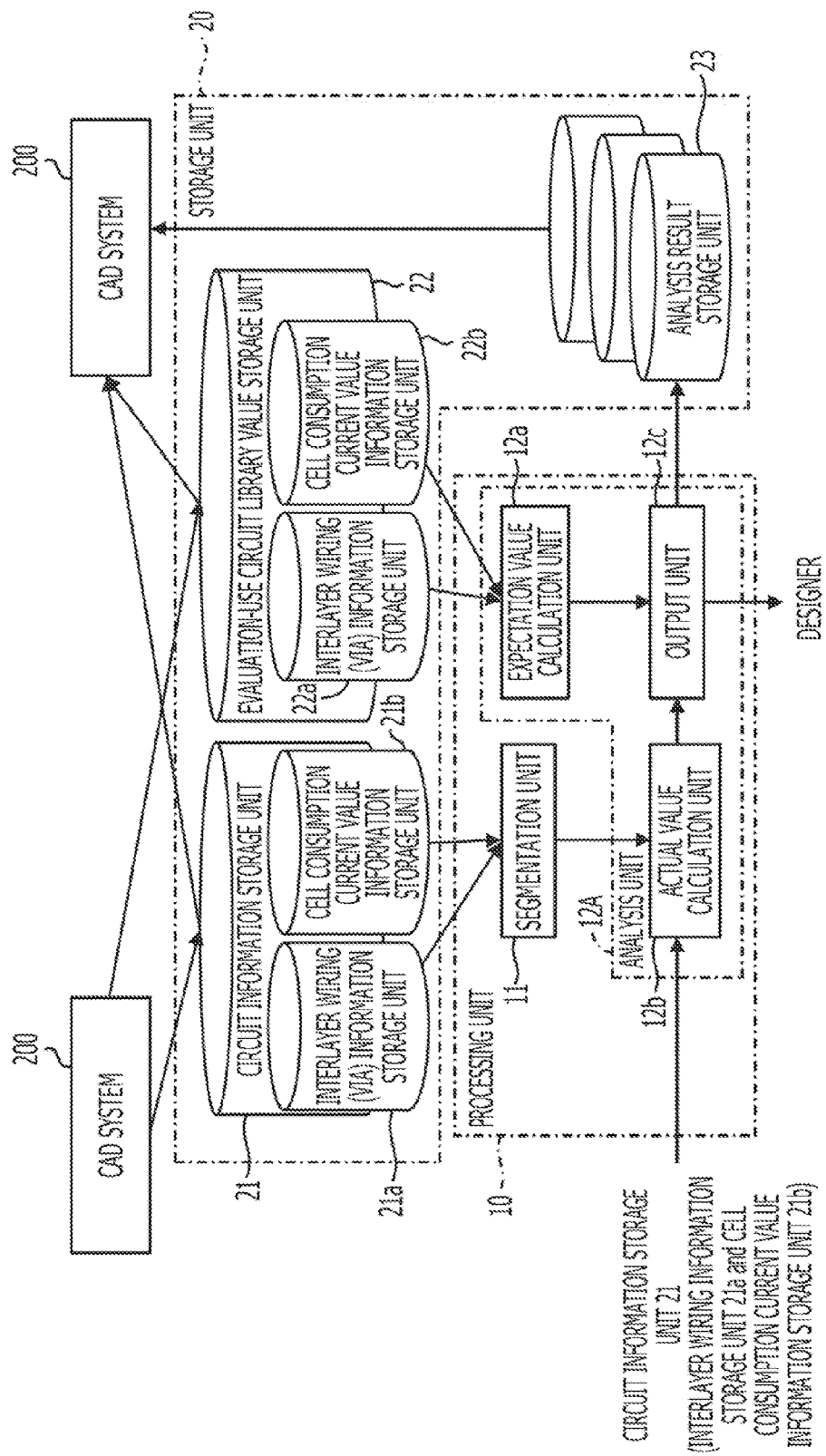

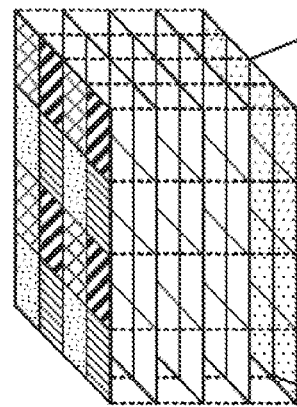
FIG. 2A
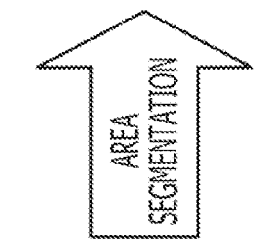
AREA SEGMENTATION
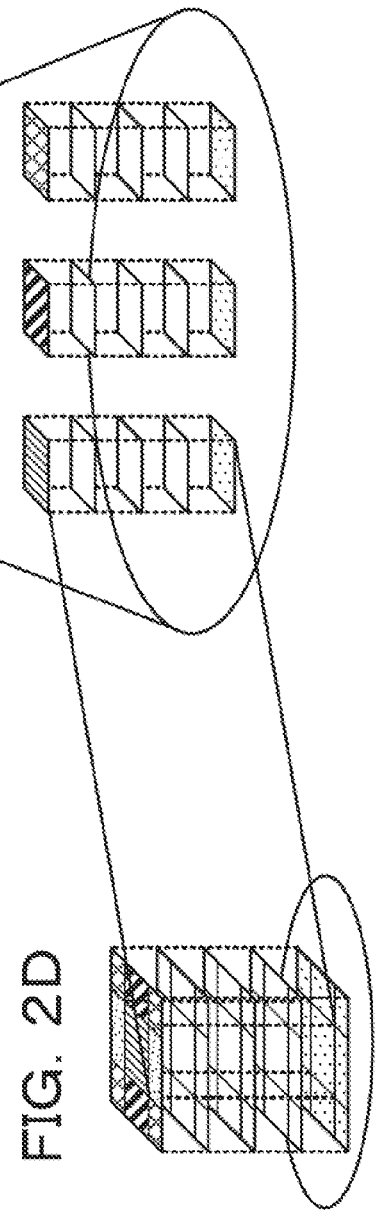
FIG. 2B
FIG. 2C
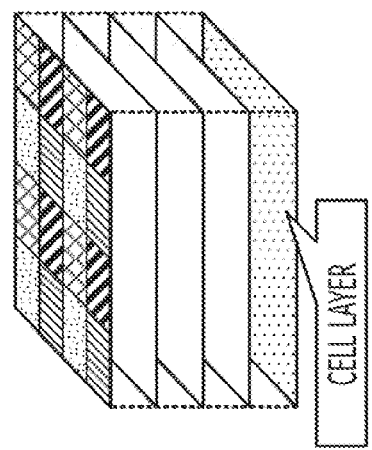
FIG. 2D
CELL LAYER

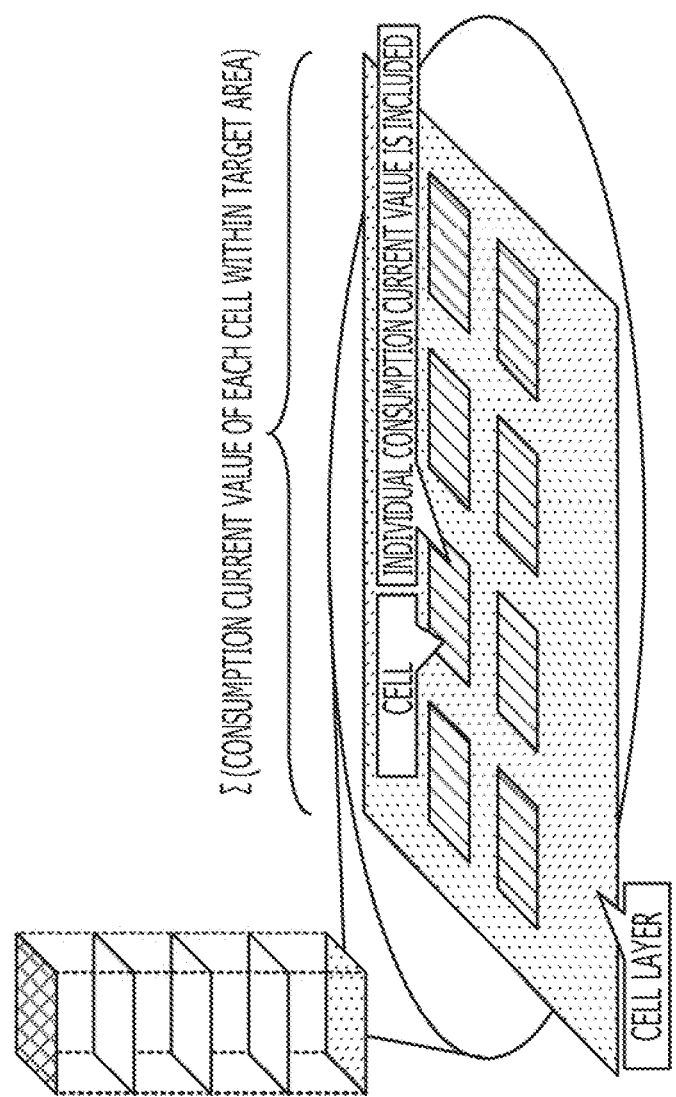

POWER CIRCUIT ANALYSIS APPARATUS AND METHOD THAT OUTPUTS AN ANALYSIS RESULT FOR SEGMENTED REGIONS OF THE POWER CIRCUIT

CROSS-REFERENCE TO RELATED APPLICATIONS

This application is based upon and claims priority to prior Japanese Patent Application No. 2010-139119 filed on Jun. 18, 2010 in the Japan Patent Office, the entire contents of which are incorporated herein by reference.

FIELD

An embodiment of the present invention relates to a power circuit analysis apparatus and method.

BACKGROUND

In recent years, in accordance with the application of large-scale semiconductor circuits such as large scale integration (LSI) or the like, the miniaturization of wiring, the increase of the amount of power line wiring, and the application of low-voltage power, power circuit analysis has been important in the design stage of a semiconductor circuit. In the power circuit analysis, mesh type power line wiring leading from a power source to a load device is regarded as electrical resistance in the semiconductor circuit, a voltage drop in the power source which occurs owing to the electrical resistance is detected, and it is analyzed whether or not a voltage used for supplying a sufficient power source is applied to each of a number of load devices. At this time, a resistor model is created on the basis of the power line wiring of a whole analysis target circuit, and a voltage current value calculation is performed.

For example, a usual power circuit analysis apparatus 100 illustrated in FIG. 10 is an apparatus that performs power circuit analysis on an analysis target circuit on the basis of the circuit information of the analysis target circuit which is generated in a computer aided design (CAD) system 200, and includes a model generation unit 101 and an analysis unit 102. The model generation unit 101 generates a non-compressed circuit model in which the power line wiring of a whole power circuit is directly modeled. Namely, the model generation unit 101 generates a non-synthetic resistor model that is a non-compressed circuit model from the power line wiring of the whole power circuit. The analysis unit 102 performs power circuit analysis on the basis of the non-compressed/non-synthetic resistor model generated by the model generation unit 101. The CAD system 200 reflects the analysis result of the analysis unit 102 in the circuit information of the analysis target circuit. When analysis is performed on the basis of the non-compressed/non-synthetic resistor model as described above, the number of devices to be analysis targets increases. Therefore, a processing time and a memory capacity especially cited as an enormous amount of computer resources are necessary, and hence it has been difficult to analyze the power circuit on the basis of a realistic time and a realistic memory capacity.

Therefore, for example, a power circuit analysis apparatus 110 illustrated in FIG. 11 has been also proposed. The power circuit analysis apparatus 110 is also an apparatus that performs power circuit analysis on an analysis target circuit on the basis of the circuit information of the analysis target circuit generated in the CAD system 200, and includes a model generation unit 111 and an analysis unit 112. The model generation unit 111 generates a synthetic resistor model in which the resistor of the power line wiring of a power circuit is synthesized. The analysis unit 112 performs power circuit analysis on the basis of the synthetic resistor model generated by the model generation unit 111. The CAD system 200 reflects the analysis result of the analysis unit 112 in the circuit information of the analysis target circuit. In the power circuit analysis apparatus 110, by using the synthetic resistor model, it is possible to significantly reduce a memory capacity necessary for the power circuit analysis and significantly reduce a time necessary for the power circuit analysis compared with a case in which a non-synthetic resistor model is used.

In addition, there has been proposed a technique in which power source analysis is performed in accordance with a resistor model generated on the basis of the circuit information of the segmented region with respect to a plurality of segmented regions into which an analysis target region of a power circuit. According to the technique, since the analysis target region is segmented, it is possible to execute the power circuit analysis in parallel, and it is possible to perform analysis in a short time. In addition to the technique, it is possible to execute the power circuit analysis for only a desired region in a short time compared with a case in which the analysis target region is not segmented.

As described above, the miniaturization of wiring, the increase of the amount of power line wiring, and the application of low-voltage power, the importance of the power circuit analysis has been increased, and the amount of power line wiring of an analysis target has been significantly increased with the progress of a technology in accordance with the application of large-scale integrated circuits. Regardless of such a situation, since the power circuit analysis is performed for the power line wiring of a whole circuit as an analysis target, an immense amount of memory consumption has been necessary at the analysis and an immense amount of time has been necessary for the analysis. Therefore, an immense amount of man-hours is also necessary for specifying and correcting an error position, and it may also be difficult to perform the analysis owing to the lack of computer resources.

In particular, as described above, it has been difficult to analyze the power circuit with a realistic time and a realistic memory capacity, when the non-compressed circuit model is used in which a circuit geometry is directly modeled as illustrated in FIG. 10.

In addition, when the synthetic resistor model is used as illustrated in FIG. 11, it is possible to reduce the amount of memory utilization and a processing time. However, since an actual circuit geometry is different from a circuit geometry after synthesis, it is difficult to correctly specify an error position even if an error is detected on the basis of the analysis.

Furthermore, in a case in which the whole analysis target region is segmented into a plurality of segmented regions, while analysis processing is realized in which the amount of memory utilization and a processing time are lowered, a resistor model of the related art is generated and a voltage current value calculation is performed in the analysis processing thereof. Therefore, enormous amounts of computer resources and a processing time remain to be necessary for matrix operation executed in the voltage current value calculation.

An example of documents relating to a power circuit analysis apparatus and a power circuit analysis method is listed below.

[Patent Document 1] Japanese Laid-open Patent Publication No. 2009-289062.

SUMMARY

According to an aspect of the invention, a power circuit analysis apparatus includes a segmentation unit that segments an analysis target region in a power circuit included in an analysis target circuit into a plurality of segmented regions, and an analysis unit that outputs an analysis result of the power circuit with respect to each of the plurality of segmented regions on a basis of a consumption current value in the segmented region and a number of via holes formed in each interlayer connecting power line wirings in upper and lower layers to each other in the segmented region.

As one aspect, an object of the present invention is to perform power circuit analysis at high speed with a small amount of memory utilization and a high degree of accuracy.

In addition, an object of the present invention is not limited to the above-mentioned object, and the object of the present invention is to achieve a function effect derived from individual configurations illustrated in the best mode for practicing the invention described later. And, the function effect not being obtained on the basis of a technique of the related art, and the function effect may also be positioned as another object of this matter.

The object and advantages of the invention will be related and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a block diagram illustrating a hardware configuration and a functional configuration of a power circuit analysis apparatus according to a first embodiment;

FIG. 2A is a diagram illustrating a segmentation method for an analysis target region according to the first embodiment;

FIG. 2B is a diagram illustrating a segmentation method for an analysis target region according to the first embodiment;

FIG. 2C is a diagram illustrating a segmentation method for an analysis target region according to the first embodiment;

FIG. 2D is a diagram illustrating a segmentation method for an analysis target region according to the first embodiment;

FIG. 3 is a diagram illustrating a calculation method for a consumption current value in a target area according to the first embodiment;

DESCRIPTION OF EMBODIMENTS

Figure 4:
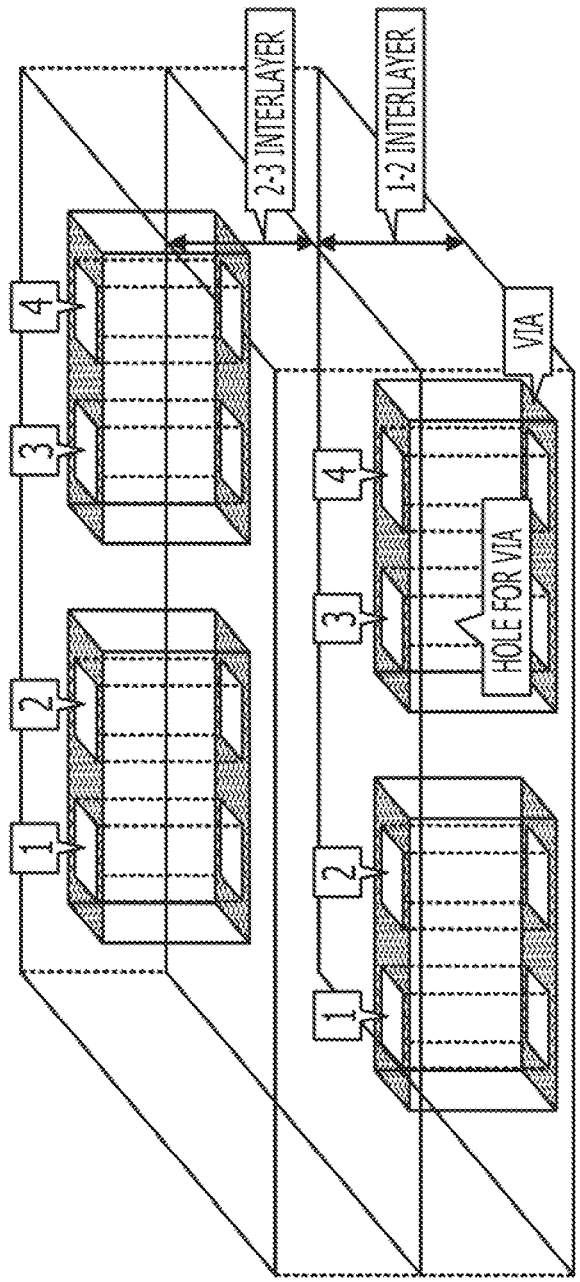
FIG. 4 is a diagram illustrating the count of the number of holes for vias within a target area according to the first embodiment.

Hereinafter, an embodiment will be described with reference to figures.

In addition, in the following embodiment, it is assumed that an analysis target circuit is an integrated circuit such as an LSI or the like designed by using a CAD system, for example.

In addition, it is assumed that a power circuit analysis apparatus is an apparatus different from the CAD system in the following embodiment. Alternatively, it is assumed that the power circuit analysis apparatus and the CAD system are programs which are different from each other and operate on a computer. However, the invention is not limited to the examples, and the power circuit analysis apparatus may be an apparatus that is integrated with the CAD system and functions as an apparatus used for providing an additional function of the CAD system. In addition, the power circuit analysis program may be a program that operates, as an embedded program used for providing an additional function of the CAD program in cooperation with the CAD program.

Usually, since an LSI power circuit becomes complex, the LSI power circuit is segmented into a plurality of layers and wired. Holes are formed at the time of wiring in each interlayer so as to connect power line wirings in upper and lower layers to each other are called "vias". In addition, a power-supply unit to which a power source applies a voltage is located in an uppermost layer of the analysis target circuit, and the power-supply unit forms a part of the power circuit. In addition, a via used for supplying a current to a load device is connected to a lowermost layer of the analysis target circuit, the current flowing through the power line wiring of each of the layers and a via connecting the upper side and lower side of each of the layers to each other on the basis of the voltage applied from the power-supply unit located in the uppermost layer. Namely, the power circuit is a power network which is formed by the power-supply unit, the power line wirings, and the vias.

As described in the following embodiment, focusing on the fact that the number of holes for vias formed in each interlayer has a correlation with resistance, the power circuit analysis apparatus according to the invention specifies a region that may include an error position on the basis of the number of holes for vias and a consumption current value. A detailed resistor model is generated with respect to the specified region that may include an error position, and power circuit analysis is performed. Accordingly, the power circuit analysis for the analysis target circuit is performed at high speed with a small amount of memory utilization and a high degree of accuracy. Here, when the number of holes for vias in an interlayer is large, the resistance thereof is small. In addition, when the number of holes for vias in an interlayer is small, the resistance thereof is large. Namely, the resistance of an interlayer is inversely proportional to the number of holes for vias. And, when it is assumed that the resistance thereof is R and the number of holes for vias is VIA, the relationship between the R and VIA is indicated by the following Expression (1).

$$R \propto 1/VIA \quad (1)$$

[1] Description of First Embodiment

[1-1] Configuration of Power Circuit Analysis Apparatus According to First Embodiment FIG. 1 is a block diagram illustrating the hardware configuration and the functional configuration of a power circuit analysis apparatus 1A according to a first embodiment.

The power circuit analysis apparatus 1A illustrated in FIG. 1 is an apparatus performing power circuit analysis for an analysis target circuit, for example, an integrated circuit such as an LSI or the like, and includes a computer such as a usual personal computer or the like. In addition, the power circuit analysis apparatus 1A includes a processing unit 10 and a storage unit 20, and furthermore includes an input device for inputting various kinds of information operated by a user to the present apparatus 1A and an output device for outputting an analysis result described later to the user. The input device is a keyboard or a mouse, and the output device is a display, a printer, or an interface used for various kinds of storage media, for example. In addition, the processing unit 10 is a central processing unit (CPU) or the like. In addition, the storage unit 20 may be an internal storage device such as a random access memory (RAM), a hard disk drive (HDD), a solid state drive (SSD), or the like, or an external storage device.

By executing a power circuit analysis program, the processing unit 10 functions as a segmentation unit 11 and an analysis unit 12A (an expectation value calculation unit 12a, an actual value calculation unit 12b, and an output unit 12c), described later.

In addition, besides functioning as a circuit information storage unit 21, an evaluation circuit library value storage unit 22, and an analysis result storage unit 23 which is described later, the storage unit 20 arbitrarily stores various kinds of information set by the user, the power circuit analysis program, and the like.

Here, the circuit information storage unit 21 is a storage unit for storing the circuit information of the analysis target circuit which is generated in the CAD system 200, and the circuit information storage unit 21 includes an interlayer wiring information storage unit 21a and a cell consumption current value information storage unit 21b.

The interlayer wiring information storage unit 21a stores the information of an interlayer in the power circuit included in the circuit information of the analysis target circuit, namely, information relating to a via. As the information relating to a via, for example, the disposition position of a via located in each interlayer in the analysis target circuit and the like are included.

The cell consumption current value information storage unit 21b stores the consumption current value information of a cell included in the circuit information of the analysis target circuit. A cell in the analysis target circuit is a cell that is disposed in a cell layer located in a lowermost layer of the analysis target circuit and consumes a current, and the cell is formed using a transistor, for example. As the consumption current value information of a cell in the analysis target circuit, various kinds of information are included that are used when a consumption current value in each of segmented regions in the analysis target circuit and a consumption current value in each of cells in the analysis target circuit are calculated on the basis of the following Expressions (7) and (8).

In addition, the evaluation circuit library value storage unit 22 is a storage unit storing information used for calculating an expectation value described later, specifically used for the circuit information of an evaluation circuit, generated in the CAD system 200, and includes an interlayer wiring information storage unit 22a and a cell consumption current value information storage unit 22b. The evaluation circuit is a circuit manufactured so as to perform initial evaluation prior to the design of the analysis target circuit, and the evaluation circuit is a preproduction version of the analysis target circuit. The analysis target circuit is a circuit obtained by subjecting the above-mentioned evaluation circuit to addition, modification, and improvement.

The interlayer wiring information storage unit 22a stores the information of an interlayer in the power circuit including in the circuit information of the evaluation circuit, namely, information relating to a via. The information relating to a via includes the disposition position of a via located in each interlayer in the evaluation circuit and the like, for example.

The cell consumption current value information storage unit 22b stores the consumption current value information of a cell which is included in the circuit information of the evaluation circuit. A cell in the analysis target circuit is a cell that is disposed in a cell layer located in a lowermost layer of the evaluation circuit and consumes a current, and the cell is formed by using a transistor, for example. As the consumption current value information of a cell in the evaluation circuit, various kinds of information are included that are used when a consumption current value in the evaluation circuit and a consumption current value in each of cells in the evaluation circuit are calculated on the basis of the following Expressions (2) and (3).

The analysis result storage unit 23 stores an analysis result obtained by an analysis unit 12A in the processing unit 10 in such a way as described later.

Next, functions as the segmentation unit 11 and the analysis unit 12A (the expectation value calculation unit 12a, the actual value calculation unit 12b, and the output unit 12c), fulfilled by the processing unit 10 according to the first embodiment will be described in detail.

As illustrated in FIGS. 2A to 2D, the segmentation unit 11 segments an analysis target region of the power circuit in the analysis target circuit into a plurality of segmented regions. At this time, as illustrated in FIGS. 2A and 2B, the segmentation unit 11 segments the power line wiring data of the analysis target region into a plurality of segmented regions on the basis of the current values of cells. Hereinafter, the "segmented region" is referred to as an "area" in some cases. More specifically, the segmentation unit 11 performs area segmentation on the basis of a unit region used for performing power supply in the analysis target circuit, for example. The above-mentioned unit region used for performing power supply is a small rectangle region used for power supply, and the small rectangle region is called a bump area. The bump area is a unit used for performing power supply in an LSI, and since a consumption current value widely varies depending on each bump area, it is desirable to segment the analysis target region with respect to each bump area at the time of power circuit analysis.

In addition, the segmentation unit 11 includes an influencing range in each segmented region that is adjacent to and electrically influences the boundary of each segmented region. Namely, as illustrated in FIGS. 2C and 2D, by additionally extracting the influencing range of the boundary portion of each area, each area segmented by the segmentation unit 11 is extracted so that the boundary portion of each segmented area overlaps with that of an adjacent area. Accordingly, it is expected that analysis accuracy for the boundary portion is improved.

In addition, FIGS. 2A to 2D are diagrams illustrating a segmentation method for the analysis target region according to the first embodiment. While an analysis target circuit illustrated in FIGS. 2A to 2D includes five layers, and the lowermost layer thereof is a cell layer, the invention is not limited to the example. In addition, while the analysis target region is segmented into 4×4=16 areas on the basis of bump areas in the example illustrated in FIGS. 2A to 2D, the invention is not limited to the example.

The analysis unit 12A analyzes the power circuit of the analysis target circuit with respect to each segmented region on the basis of a consumption current value in each segmented region segmented by the segmentation unit 11 and the number of holes for vias formed in each interlayer so as to connect power line wirings in upper and lower layers to each other in each segmented region. The analysis unit 12A includes functions as the expectation value calculation unit 12a, the actual value calculation unit 12b, and the output unit 12c.

The expectation value calculation unit 12a includes a function as a first expectation value calculation unit and a function as a second expectation value calculation unit.

The first expectation value calculation unit 12a calculates, as an individual-interlayer expectation value, the expectation value of the number of holes for vias per unit consumption current value in each interlayer in the analysis target circuit. In particular, the first expectation value calculation unit 12a calculates, as an individual-interlayer expectation value, the number of holes for vias per unit consumption current value in each interlayer in the above-mentioned evaluation circuit.

The second expectation value calculation unit 12a calculates the expectation value of the number of holes for vias per unit consumption current value in all interlayers as an all-interlayer expectation value in the analysis target circuit. In particular, the second expectation value calculation unit 12a calculates the number of holes for vias per unit consumption current value in all interlayers as an all-interlayer expectation value in the above-mentioned evaluation circuit.

The actual value calculation unit 12b includes a function as a first actual value calculation unit and a function as a second actual value calculation unit. With respect to each segmented region, the first actual value calculation unit 12b calculates the number of holes for vias per unit consumption current value in each interlayer as an individual-interlayer actual value in the analysis target circuit. With respect to each segmented region, the second actual value calculation unit 12b calculates the number of holes for vias per unit consumption current value in all interlayers as an all-interlayer actual value in the analysis target circuit.

Figure 6:
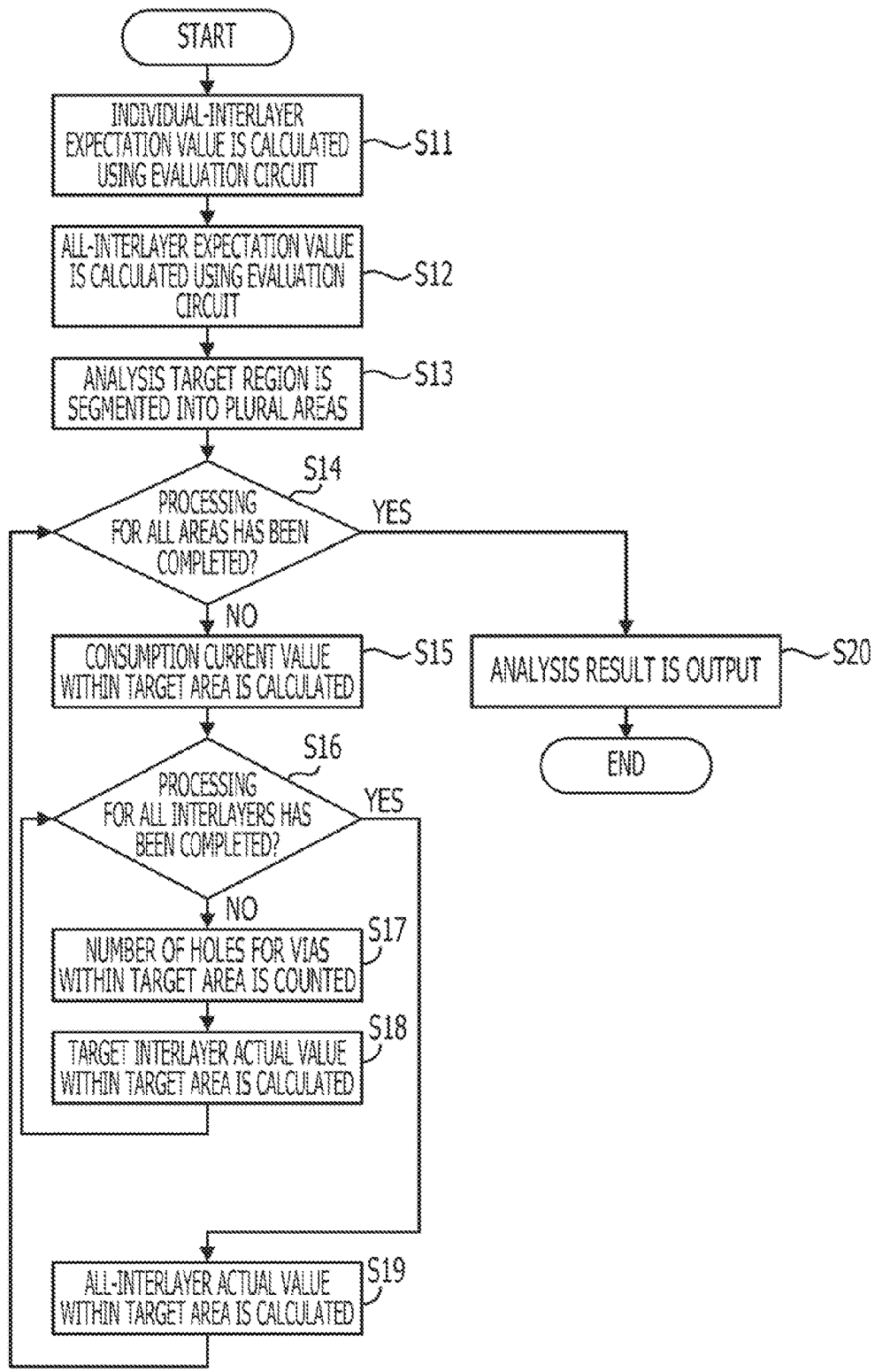
FIG. 6 is a flowchart illustrating an operation performed in a power circuit analysis apparatus according to the first embodiment.

In addition, a calculation method for the individual-interlayer expectation value and the all-interlayer expectation value, performed in the expectation value calculation unit 12a and a calculation method for the individual-interlayer actual value and the all-interlayer actual value, performed in the actual value calculation unit 12b, will be described later with reference to FIGS. 3, 4, and 6.

The output unit 12c includes a function as a first output unit and a function as a second output unit. The first output unit 12c outputs the individual-interlayer expectation value calculated by the first expectation value calculation unit 12a and the individual-interlayer actual value calculated by the first actual value calculation unit 12b with respect to each segmented region as an analysis result to a designer. The second output unit 12c outputs the all-interlayer expectation value calculated by the second expectation value calculation unit 12a and the all-interlayer actual value calculated by the second actual value calculation unit 12b with respect to each segmented region as an analysis result to the designer. The output unit 12c may output the number of holes for vias in each area in each layer which is counted at the time of the calculation of the individual-interlayer actual value in each area as one of analysis results to the designer. Furthermore, the output unit 12c may output a consumption current value in each area which is calculated at the time of the calculation of the individual-interlayer actual value in each area as one of analysis results to the designer.

In addition, the output unit 12c includes the output device and can subject, as numerical values, the individual-interlayer expectation value, the individual-interlayer actual value, the all-interlayer expectation value, the all-interlayer actual value, the count value of the number of holes for vias, and the consumption current value, which are obtained with respect to each area, to display output, printing output, or data output. In addition, the output unit 12c may also subject the individual-interlayer expectation value, the individual-interlayer actual value, the all-interlayer expectation value, the all-interlayer actual value, the count value of the number of holes for vias, and the consumption current value, which are obtained with respect to each area, to display output, printing output, or data output, in such graph form as illustrated in FIG. 5A or 5B, for example.

Figure 5A:
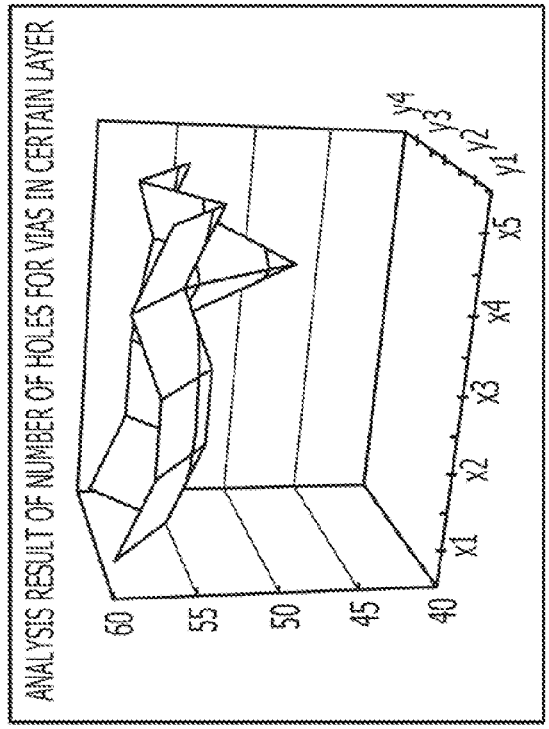
FIG. 5A is a diagram illustrating the output of an analysis result according to the first embodiment.
Figure 5B:
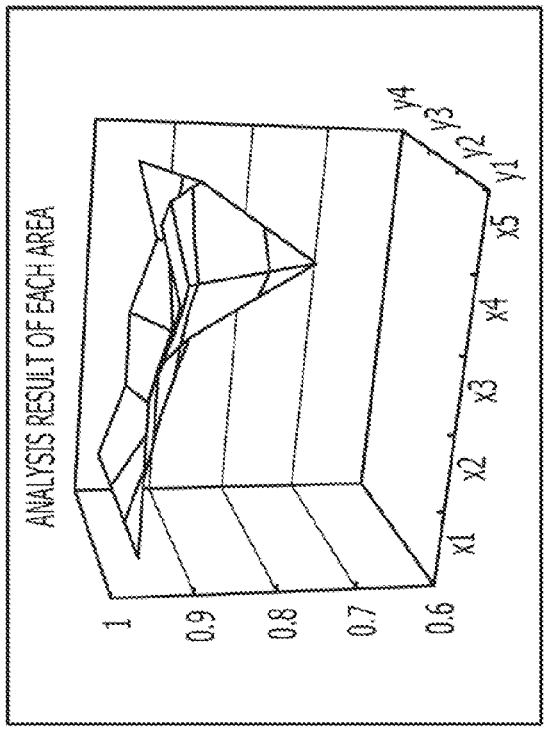
FIG. 5B is a diagram illustrating the output of an analysis result according to the first embodiment.

FIGS. 5A and 5B are diagrams illustrating the output of an analysis result according to the first embodiment. FIG. 5A is an example when the individual-interlayer actual value or the all-interlayer actual value in each area is output and displayed in three-dimensional graph form. FIG. 5B is an example when the number of holes for vias in each area in a layer which is counted at the time of the calculation of the individual-interlayer actual value in each area is output and displayed in three-dimensional graph form.

[1-2] Operation Performed in Power Circuit Analysis Apparatus According to First Embodiment Next, the function and the operation of the power circuit analysis apparatus 1A according to the first embodiment configured in such a way as described above will be described in accordance with a flowchart (Operations S11 to S20) illustrated in FIG. 6, with reference to FIGS. 2A to 5B.

[1-2-1] Calculation of Individual-Interlayer Expectation Value (Operation S11)

First, the expectation value calculation unit 12a acquires the power source voltage value of the analysis target circuit from the circuit information storage unit 21, and the expectation value calculation unit 12a calculates the number of holes for vias per unit consumption current value in each interlayer in the above-mentioned evaluation circuit as the individual-interlayer expectation value on the basis of the power source voltage value. As described above, before the authorized development of an integrated circuit such as an LSI or the like, an evaluation circuit that is the test model of the integrated circuit is produced, and initial evaluation is performed on a new technology. Information relating to the evaluation circuit is provided as a library, and the information relating to the evaluation circuit is preliminarily stored in the evaluation circuit library value storage unit 22. In addition, the expectation value calculation unit 12a calculates an individual-interlayer expectation value as follows on the basis of the information stored in the evaluation circuit library value storage unit 22.

Here, it is assumed that the number of layers in the analysis target circuit and the number of layers in the evaluation circuit are n+1. It is assumed that an interlayer portion between the ith layer and the i+1th layer is expressed as "i-(i+1) interlayer" (i=1, 2, ..., and n). In addition, it is assumed that the number of holes for vias in a 1-2 interlayer is $VIA_1$, the number of holes for vias in a 2-3 interlayer is $VIA_2$, ..., the number of holes for vias in an i-(i+1) interlayer is $VIA_i$, ..., and the number of holes for vias in an n-(n+1) interlayer is $VIA_n$.

The expectation value calculation unit 12a acquires these numbers of holes $VIA_1$, $VIA_2$, ..., and $VIA_n$. At this time, when the number of holes for vias $VIA_1$, $VIA_2$, ..., and $VIA_n$ are preliminarily stored in the interlayer wiring information storage unit 22a in the evaluation circuit library value storage unit 22 as interlayer wiring information, the expectation value calculation unit 12a reads and acquires the number of holes for vias $VIA_1$, $VIA_2$, ..., and $VIA_n$ from the storage unit 22a. In addition, when the number of holes for vias $VIA_1$, $VIA_2$, ..., and $VIA_n$ are not stored in the storage unit 22a, the expectation value calculation unit 12a may refer to interlayer wiring information in the interlayer wiring information storage unit 22a, and acquire the number of holes for vias $VIA_1$, $VIA_2$, ..., and $VIA_n$ by counting the number of holes for vias included in the interlayer wiring information with respect to each layer (refer to FIG. 4).

In addition, the expectation value calculation unit 12a acquires the consumption current value of the evaluation circuit. At this time, when the consumption current value of the evaluation circuit is preliminarily stored in the cell consumption current value information storage unit 22b in the evaluation circuit library value storage unit 22, the expectation value calculation unit 12a reads and acquires the consumption current value of the evaluation circuit from the storage unit 22b.

In addition, when the consumption current value of the evaluation circuit is not stored in the storage unit 22b, the expectation value calculation unit 12a refers to cell consumption current value information in the cell consumption current value information storage unit 22b, and calculates the consumption current value of the evaluation circuit on the basis of the cell consumption current value information and the power source voltage value of the analysis target circuit. At this time, the consumption current value of the evaluation circuit is calculated as the sum of consumption current values of individual cells within the evaluation circuit as illustrated in the following Expression (2), and the consumption current value of each cell within the evaluation circuit is calculated on the basis of the following Expression (3). Accordingly, the consumption current value of the evaluation circuit is calculated on the basis of the following Expressions (2) and (3).

[the consumption current value of the evaluation circuit]=Σ[the consumption current value of each cell within the evaluation circuit]  (2)

[the consumption current value of each cell]=$IDC$+ (½*$V$*$CI$*$SW$*$f$+½*$V$*$CO$*$SW$*$f$)  (3)

In this regard, however, the V is the power source voltage value of the analysis target circuit, the f is the operating frequency of the analysis target circuit, the CI is an input capacitance value, the CO is an output capacitance value, the SW is an operation ratio, and the IDC is a leak current value. In addition, the CI, CO, SW, and IDC are acquired from the cell consumption current value information storage unit 22b.

The expectation value calculation unit 12a calculates individual-interlayer expectation values, namely, [the expectation value of the 1-2 interlayer], [the expectation value of the 2-3 interlayer], ..., [the expectation value of the i-(i+1) interlayer], ..., [the expectation value of the n-(n+1) interlayer] on the basis of the following Expressions (4-1) to (4-n), respectively. Each of the expectation values given on the basis of these (4-1) to (4-n) is the number of holes for vias per unit consumption current value in each interlayer in the evaluation circuit.

[the expectation value of the 1-2 interlayer]=$VIA_1$/[the consumption current value of the evaluation circuit]  (4-1)

[the expectation value of the 2-3 interlayer]=$VIA_2$/[the consumption current value of the evaluation circuit]  (4-2)

...

[the expectation value of the i-(i+1) interlayer]=$VIA_i$/[the consumption current value of the evaluation circuit]  (4-i)

...

[the expectation value of the n-(n+1) interlayer]=$VIA_n$/[the consumption current value of the evaluation circuit]  (4-n)

[1-2-2] Calculation of All-Interlayer Expectation Value (Operation S12)

The expectation value calculation unit 12a calculates the number of holes for vias per unit consumption current value as the all-interlayer expectation value in all interlayers in the above-mentioned evaluation circuit by using [the consumption current value of the evaluation circuit] calculated in accordance with the above-mentioned Expressions (2) and (3) on the basis of the power source voltage value V of the analysis target circuit.

Here, when it is assumed that the resistance value of the i-(i+1) interlayer is Ri, $Ri \propto 1/VIA_i$ is satisfied on the basis of the above-mentioned Expression (1), and the resistance value of all interlayers, namely, the first layer to the nth layer, may be expressed as $R_1 + R_2 + \ldots + R_n \propto 1/VIA_1 + 1/VIA_2 + \ldots + 1/VIA_n$. Accordingly, a value corresponding to the number of holes for vias in all interlayers, namely, the first layer to the nth layer, is calculated on the basis of the following Expression (5) in accordance with the above-mentioned Expression (1).

$$[\text{the number of holes for vias in all interlayers}] = \\ 1/(1/VIA_1 + 1/VIA_2 + \ldots + 1/VIA_n) = \\ (VIA_1 * VIA_2 * VIA_3 * \ldots * VIA_n)/(VIA_2 * VIA_3 * \ldots * VIA_n) + \\ (VIA_1 * VIA_3 * \ldots * VIA_n) + \ldots + (VIA_1 * VIA_2 * \ldots * VIA_{n-1})\} \quad (5)$$

The expectation value calculation unit 12a calculates the all-interlayer expectation value in accordance with the following Expression (6), on the basis of [the number of holes for vias in all interlayers] calculated in accordance with the above-mentioned Expression (5) and [the consumption current value of the evaluation circuit] calculated in accordance with the above-mentioned Expressions (2) and (3).

[the all-interlayer expectation value]=[the number of holes for vias in all interlayers]/[the consumption current value of the evaluation circuit]  (6)

[1-2-3] Area Segmentation (Operation S13; Segmentation Operation)

Next, as described above with reference to FIGS. 2A to 2D, the segmentation unit 11 segments the analysis target region of the power circuit in the analysis target circuit into a plurality of areas. At that time, the segmentation unit 11 segments the analysis target region into a plurality of areas on the basis of bump areas. Furthermore, the segmentation unit 11 improves analysis accuracy for the boundary portion by additionally extracting the influencing range of the boundary portion of each area.

[1-2-4] Determination of Completion of Processing for All Areas (Operation S14)

Processing performed in the following Operations S14 to S19 is executed by the actual value calculation unit 12b in the processing unit 10.

First, the actual value calculation unit 12b determines whether or not the following Operations S15 to S19 have been executed for all areas segmented by the segmentation unit 11 in Operation S14. When processing for all areas has not been executed (NO route in Operation S14), the actual value calculation unit 12b selects one of unprocessed areas and executes the processing in the following Operations S15 to S19 for the selected area. On the other hand, when processing for all areas has been executed (YES route in Operation S14), the output unit 12c executes processing in Operation S20 described later. In addition, one area selected by the actual value calculation unit 12b is referred to as "target area" hereinafter.

[1-2-5] Calculation of Consumption Current Value within Target Area (Operation S15)

The actual value calculation unit 12 refers to the cell consumption current value information in the cell consumption current value information storage unit 21b, and the actual value calculation unit 12 calculates the consumption current value of a target area on the basis of the cell consumption current value information and the power source voltage value of the analysis target circuit. At this time, the consumption current value of the target area is calculated as the sum of consumption current values of individual cells existing in the target area as illustrated in FIG. 3 and the following Expression (7), and the consumption current value of each cell is calculated on the basis of the following Expression (8) that is substantially the same as the above-mentioned Expression (3). Accordingly, the consumption current value within the target area is calculated and acquired on the basis of the following Expressions (7) and (8). In addition, FIG. 3 is a diagram illustrating a calculation method for the consumption current value in the target area according to the first embodiment.

[the consumption current value of the target area]=Σ
[the consumption current value of each cell
within the target area]     (7)

[the consumption current value of each cell]=$IDC$+
($\frac{1}{2}*V*CI*SW*f+\frac{1}{2}*V*CO*SW*f$)     (8)

In this regard, however, the V is the power source voltage value of the analysis target circuit, the f is the operating frequency of the analysis target circuit, the CI is an input capacitance value, the CO is an output capacitance value, the SW is an operation ratio, and the IDC is a leak current value. In addition, the CI, CO, SW, and IDC are acquired from the cell consumption current value information storage unit 22b.

[1-2-6] Determination of Completion of Processing for All interlayers (Operation S16)

In Operation S16, the actual value calculation unit 12b determines whether or not the following Operations S17 and S18 have been executed for all interlayers (the first to the nth interlayers) in the target area. When processing for all interlayers has not been executed (NO route in Operation S16), the actual value calculation unit 12b selects one of unprocessed interlayers and executes the processing in the following Operations S17 and S18 for the selected interlayer. On the other hand, when processing for all interlayers has been executed (YES route in Operation S16), the actual value calculation unit 12b proceeds to processing in Operation S19 described later. In addition, one interlayer selected by the actual value calculation unit 12b is referred to as "target interlayer" hereinafter.

[1-2-7] Count of Number of Holes for Vias in Target Interlayer within Target Area (Operation S17)

As illustrated in FIG. 4, the actual value calculation unit 12b counts the number of holes for vias existing in the target interlayer selected within the target area. At that time, the actual value calculation unit 12b can count and acquire the number of holes for vias in the target interlayer within the target area by referring to interlayer wiring information (via information) in the interlayer wiring information storage unit 21a. Here, the number of holes for vias counted in an i-(i+1) interlayer that is a target interlayer within a target area m is expressed as $VIA_{mi}$. In addition, FIG. 4 is a diagram illustrating the count of the number of holes for vias within the target area according to the first embodiment. While, in FIG. 4, a case is illustrated in which two vias are provided in each interlayer, two holes are provided in each via, and the number of holes for vias in each interlayer is 4, this matter is not limited to the case.

[1-2-8] Calculation of Target Interlayer Actual Value within Target Area (Operation S18)

The actual value calculation unit 12b calculates the number of holes for vias per unit consumption current value in a target interlayer as an individual-interlayer actual value in the target area m. Namely, the actual value calculation unit 12b calculates a value obtained by dividing the number of holes for vias in the target interlayer within the target area m, $VIA_{mi}$, counted in Operation S17 as the actual value of the target interlayer within the target area m, by [the consumption current value of the target area] calculated on the basis of the above-mentioned Expressions (7) and (8) in Operation S15.

The actual value calculation unit 12b calculates actual values with respect to all interlayers within the target area m, by repeating the above-mentioned Operations S16 to S18. Here, it is assumed that the number of holes for vias in the 1-2 interlayer, the number of holes for vias in the 2-3 interlayer, the number of holes for vias in the i-(i+1) interlayer, and the number of holes for vias in the n-(n+1) interlayer in the target area m, counted in Operation S17, are $VIA_{m1}$, $VIA_{m2}$, $VIA_{mi}$, and $VIA_{mn}$, respectively. At this time, the actual value calculation unit 12b calculates individual-interlayer actual values, namely, [the actual value of the 1-2 interlayer], [the actual value of the 2-3 interlayer], ..., [the actual value of the i-(i+1) interlayer], ..., [the actual value of the n-(n+1) interlayer] on the basis of the following (9-1) to (9-n), respectively. The actual values given by these (9-1) to (9-n) are the number of holes for vias per unit consumption current value in individual interlayers in the target area m in the analysis target circuit.

[the actual value of the 1-2 interlayer]=$VIA_{m1}$/[the
consumption current value of the target area $m$]     (9-1)

[the actual value of the 2-3 interlayer]=$VIA_{m2}$/[the
consumption current value of the target area $m$]     (9-2)

. . .

[the actual value of the $i$-($i$+1) interlayer]=$VIA_{mi}$/[the
consumption current value of the target area $m$]     (9-i)

. . .

[the actual value of the $n$-($n$+1) interlayer]=$VIA_{mn}$/[the
consumption current value of the target area $m$]     (9-n)

[1-2-9] Calculation of All-Interlayer Actual Value within Target Area (Operation S19)

When the above-mentioned processing operations in Operations S17 and S18 are executed for all interlayers (YES route in Operation S16), the actual value calculation unit $12b$ calculates the number of holes for vias per unit consumption current value in all interlayers in the target area m as the all-interlayer actual value.

Here, a value corresponding to the number of holes for vias in all interlayers, namely, the first layer to the nth layer, in the target area m is calculated on the basis of the following Expression (10) that is substantially the same as the above-mentioned Expression (5).

$$[\text{the number of holes for vias in all interlayers in the target area } m] = (VIA_{m1} * VIA_{m2} * VIA_{m3} * \ldots * VIA_{mn}) / \{(VIA_{m2} * VIA_{m3} * \ldots * VIA_{mn}) + (VIA_{m1} * VIA_{m3} * \ldots * VIA_{mn}) + \ldots + (VIA_{m1} * VIA_{m2} * \ldots * VIA_{mn-1})\} \quad (10)$$

The actual value calculation unit $12b$ calculates the all-interlayer actual value of the target area in accordance with the following Expression (11), on the basis of [the number of holes for vias in all interlayers in the target area m] calculated in the above-mentioned Expression (10) and [the consumption current value of the target area] calculated in accordance with the above-mentioned Expressions (7) and (8) in Operation S15.

$$[\text{the all-interlayer actual value of the target area } m] = [\text{the number of holes for vias in all interlayers in the target area } m]/[\text{the consumption current value of the target area } m] \quad (11)$$

[1-2-10] Output of Analysis Result (Operation S20)

When the above-mentioned processing operations in Operations S15 to S19 are executed for all interlayers (YES route in Operation S14), an analysis result based on the analysis unit 12 is output to the designer by the output unit $12c$ and the analysis result is stored in the analysis result storage unit 23 as an analysis result. Here, examples of the output analysis result include the individual-interlayer expectation value, the individual-interlayer actual value, the all-interlayer expectation value, the all-interlayer actual value, the count value of the number of holes for vias in each area, and the consumption current value in each area, calculated and acquired in such a way as described above, respectively.

At this time, the output unit $12c$ subjects, as numerical values, the individual-interlayer expectation value, the individual-interlayer actual value, the all-interlayer expectation value, the all-interlayer actual value, the count value of the number of holes for vias in each area, and the consumption current value in each area, to display output, printing output, or data output. In addition, the output unit $12c$ subjects the individual-interlayer expectation value, the individual-interlayer actual value, the all-interlayer expectation value, the all-interlayer actual value, the count value of the number of holes for vias in each area, and the consumption current value in each area to display output, printing output, or data output, in such graph form as illustrated in FIG. 5A or 5B, for example. Such an output of the analysis result can be selected and set by the designer by operating an input device.

In the power circuit analysis apparatus 1A according to the first embodiment, focusing on the fact that the number of holes for vias formed in each interlayer has a relationship with resistance, the individual-interlayer expectation value, the individual-interlayer actual value, the all-interlayer expectation value, and the all-interlayer actual value are calculated on the basis of the number of holes for vias and the consumption current value and output. On the basis of these values, the designer specifies a region that may include an error position of the power source voltage.

Here, the individual-interlayer expectation value, the individual-interlayer actual value, the all-interlayer expectation value, and the all-interlayer actual value are values calculated as the number of holes for vias per unit consumption current value, and are values proportional to $1/\{[\text{resistance (R)}]*[\text{current (I)}]\} = 1/[\text{voltage (V)}]$, according to the above-mentioned Expression (1). Namely, the individual-interlayer expectation value, the individual-interlayer actual value, the all-interlayer expectation value, and the all-interlayer actual value are values inversely proportional to [voltage (V)]. On the basis of such a relationship, with respect to the power circuit of the analysis target circuit, the designer can perform the following determinations (a1) to (a4) on the basis of the individual-interlayer expectation value, the individual-interlayer actual value, the all-interlayer expectation value, and the all-interlayer actual value, output from the power circuit analysis apparatus 1A.

(a1) In a case in which the i-(i+1) interlayer actual value in the area m is lower than the i-(i+1) interlayer expectation value, since vias (the number of holes for vias) become insufficient in the i-(i+1) interlayer in the area m and the amount of supply current decreases, the shortage of power supply occurs on the circuit. Accordingly, the designer can determine that abnormality relating to the shortage of vias occurs in the i-(i+1) interlayer in the area m.

(a2) When the i-(i+1) interlayer actual value in the area m is greater than the i-(i+1) interlayer expectation value, vias (the number of holes for vias) become excessive in the i-(i+1) interlayer in the area m, and hence the deterioration of a fabrication yield and the increase of the amount of electric power consumption in the circuit are caused. Accordingly, the designer can determine that abnormality relating to the excess of vias occurs in the i-(i+1) interlayer in the area m.

(a3) In a case in which the all-interlayer actual value in the area m is lower than the all-interlayer expectation value, since vias (the number of holes for vias) become insufficient in the area m and the amount of supply current decreases, the shortage of power supply occurs on the circuit. Accordingly, the designer can determine that abnormality relating to the shortage of vias occurs in the area m.

(a4) When the all-interlayer actual value in the area m is greater than the all-interlayer expectation value, vias (the number of holes for vias) become excessive in the area m, and hence the deterioration of a fabrication yield and the increase of the amount of electric power consumption in the circuit are caused. Accordingly, the designer can determine that abnormality relating to the excess of vias occurs in the area m.

[1-3] Advantageous Effect of Power Circuit Analysis Apparatus According to First Embodiment In such a way, according to the power circuit analysis apparatus 1A of the first embodiment, the analysis target region is segmented into a plurality of areas, and the power circuit is analyzed with respect to each area on the basis of the number of holes for vias and the consumption current value. Accordingly, power circuit analysis for the analysis target circuit is performed at high speed with a small amount of memory utilization and a high degree of accuracy. On the basis of the output information from the power circuit analysis apparatus 1A, the designer may specify an area in which abnormality occurs. In addition, the designer generates a detailed resistor model with respect only to the specified area, and performs power circuit analysis. Accordingly, power circuit analysis for the analysis target circuit is performed at high speed with a small amount of memory utilization and a high degree of accuracy.

In particular, in the power circuit analysis apparatus 1A according to the first embodiment, the individual-interlayer expectation value, the individual-interlayer actual value, the all-interlayer expectation value, the all-interlayer actual value, the count value of the number of holes for vias, and the consumption current value, which are obtained as analysis results with respect to each area, are output in such graph form as illustrated in FIG. 5A or 5B, for example. Accordingly, just by visually confirming the display output/printing output of the analysis result, the designer may determine and specify which area abnormality occurs in or which area and which interlayer area abnormality occurs in.

[2] Description of Second Embodiment

Figure 7:
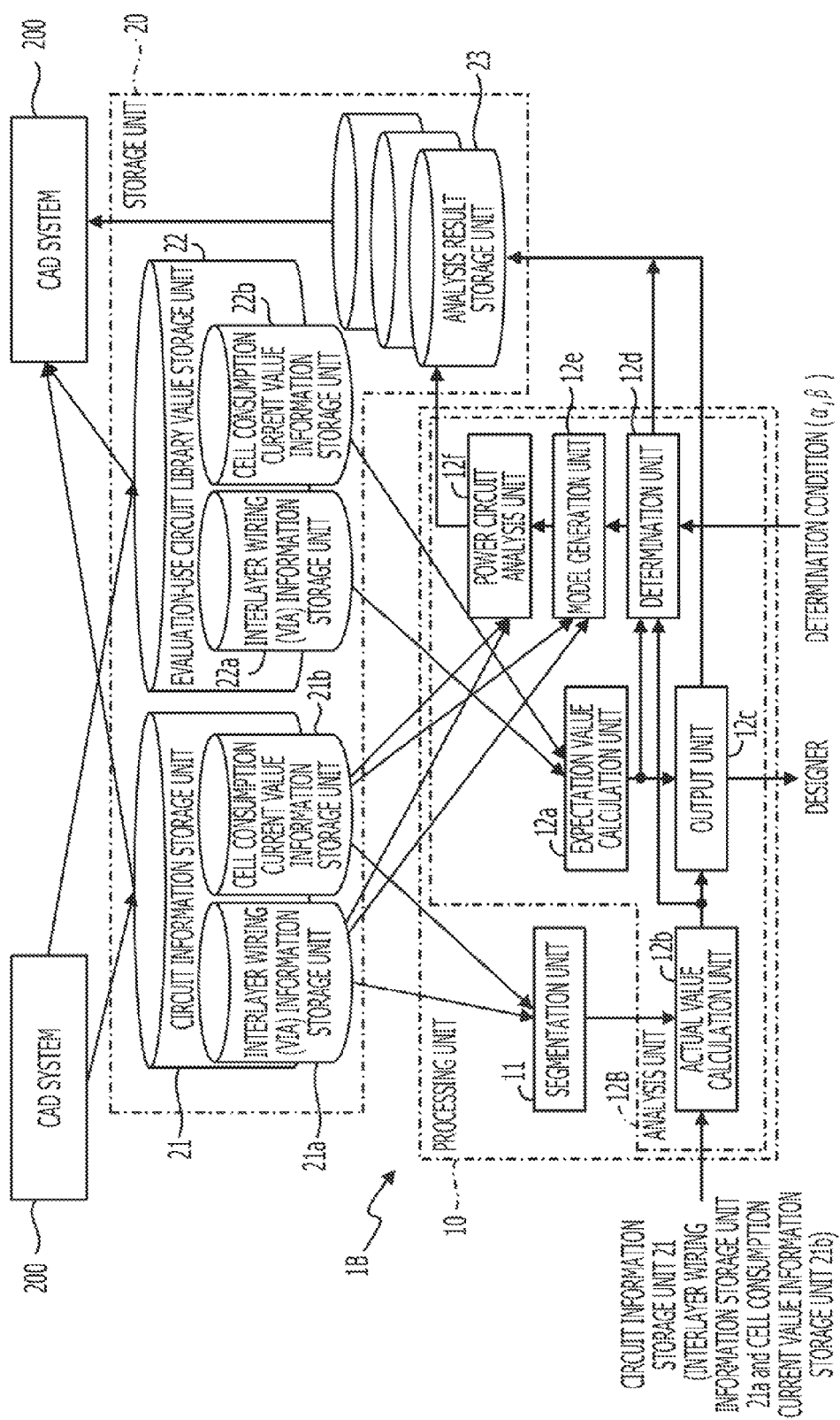
FIG. 7 is a block diagram illustrating a hardware configuration and a functional configuration of a power circuit analysis apparatus according to a second embodiment.

[2-1] Configuration of Power Circuit Analysis Apparatus According to Second Embodiment FIG. 7 is a block diagram illustrating the hardware configuration and the functional configuration of a power circuit analysis apparatus 1B according to a second embodiment. In substantially the same way as the power circuit analysis apparatus 1A according to the first embodiment, the power circuit analysis apparatus 1B illustrated in FIG. 7 is also an apparatus performing power circuit analysis for an analysis target circuit, for example, an integrated circuit such as an LSI or the like, and the power circuit analysis apparatus 1B includes a computer such as a usual personal computer or the like. In addition, the power circuit analysis apparatus 1B also includes a processing unit 10 and a storage unit 20, and furthermore includes an input device and an output device, which are substantially the same as the above-mentioned input device and output device. In addition, in FIG. 7, since the same symbol as that described above indicates the same or almost the same portion, the description thereof will be omitted.

By executing a power circuit analysis program, the processing unit 10 functions as a segmentation unit 11 that is substantially the same as that in the first embodiment, and functions as an analysis unit 12B. In addition to functions as an expectation value calculation unit 12a, an actual value calculation unit 12b, and an output unit 12c, which are substantially the same as those in the analysis unit 12A according to the first embodiment, the analysis unit 12B includes functions as a determination unit 12d, a model generation unit 12e, and a power circuit analysis unit 12f.

The determination unit 12d includes a function as a first determination unit and a function as a second determination unit. The first determination unit 12d compares individual-interlayer expectation values [refer to the above-mentioned Expression (4-i); i=1 to n] calculated by the first expectation value calculation unit 12a with individual-interlayer actual values [refer to the above-mentioned Expression (9-i); i=1 to n] calculated by the first actual value calculation unit 12b with respect to each area, respectively, and outputs the comparison results as an analysis result. In particular, the first determination unit 12d determines that a segmented region of which individual-interlayer actual value is a value existing within a first specified range including the individual-interlayer expectation value is normal (refer to the following Expression (12-1)). On the other hand, the first determination unit 12d determines that a segmented region of which individual-interlayer actual value is a value existing beyond the first specified range is abnormal (refer to the following Expressions (12-2) and (12-3)). The determination based on the first determination unit 12d is performed on the basis of the following determination Expressions (12-1) to (12-3). Determination criteria based on the determination Expressions (12-1) to (12-3) conform to the criteria of the above-mentioned determinations (a1) and (a2).

$$[\text{the expectation value of the } i\text{-}(i+1) \text{ interlayer}]-\alpha \leq \\ [\text{the actual value of the } i\text{-}(i+1) \text{ interlayer}] \leq [\text{the expectation value of the } i\text{-}(i+1) \text{ interlayer}]+\alpha: \\ \text{normal} \quad (12\text{-}1)$$

$$[\text{the actual value of the } i\text{-}(i+1) \text{ interlayer}] < [\text{the expectation value of the } i\text{-}(i+1) \text{ interlayer}]-\alpha: \text{abnormal} \\ (\text{the shortage of vias}) \quad (12\text{-}2)$$

$$[\text{the expectation value of the } i\text{-}(i+1) \text{ interlayer}]+\alpha < \\ [\text{the actual value of the } i\text{-}(i+1) \text{ interlayer}]: \text{abnormal}(\text{the excess of vias}) \quad (12\text{-}3)$$

Here, the $\alpha$ is a margin of the individual-interlayer expectation value, and the $\alpha$ is a positive value determined with respect to each technology applied to the analysis target circuit. The $\alpha$ is input to the first determination unit 12d from the above-mentioned input device or the like as a determination condition.

The second determination unit 12d compares an all-interlayer expectation value [refer to the above-mentioned Expressions (5) and (6)] calculated by the second expectation value calculation unit 12a with an all-interlayer actual value [refer to the above-mentioned Expressions (10) and (11)] calculated by the second actual value calculation unit 12b with respect to each area, and outputs the comparison result as an analysis result. In particular, the second determination unit 12d determines that a segmented region of which all-interlayer actual value is a value existing within a second specified range including the all-interlayer expectation value is normal (refer to the following Expression (13-1)). On the other hand, the second determination unit 12d determines that a segmented region of which all-interlayer actual value is a value existing beyond the second specified range is abnormal (refer to the following Expressions (13-2) and (13-3)). The determination based on the second determination unit 12d is performed on the basis of the following determination Expressions (13-1) to (13-3). Determination criteria based on the determination Expressions (13-1) to (13-3) conform to the criteria of the above-mentioned determinations (a3) and (a4).

$$[\text{the all-interlayer expectation value}]-\beta \leq [\text{the all-interlayer actual value of the target area } m] \leq [\text{the all-interlayer expectation value}]+\beta: \text{normal} \quad (13\text{-}1)$$

$$[\text{the all-interlayer actual value of the target area } m] < \\ [\text{the all-interlayer expectation value}]-\beta: \text{abnormal} \\ (\text{the shortage of vias}) \quad (13\text{-}2)$$

$$[\text{the all-interlayer expectation value}]+\beta < [\text{the all-interlayer actual value of the target area } m]: \text{abnormal} \\ (\text{the excess of vias}) \quad (13\text{-}3)$$

Here, the $\beta$ is a margin of the all-interlayer expectation value, and the $\beta$ is a positive value determined with respect to each technology applied to the analysis target circuit. The $\beta$ is input to the second determination unit 12d from the above-mentioned input device or the like as a determination condition.

In addition, the output unit 12c also outputs as analysis results, determination results based on the first determination unit/second determination unit 12d to the designer along with the individual-interlayer expectation value, the individual-interlayer actual value, the all-interlayer expectation value, the all-interlayer actual value, the count value of vias, and the consumption current value, which are obtained with respect to each area. For example, the determination result output here is information indicating which determination Expression of Expressions (12-1) to (12-3) the individual-interlayer actual value in each area fits into or which determination Expression of Expressions (13-1) to (133) the all-interlayer actual value in each area fits into.

The model generation unit 12e includes a function as a first model generation unit and a function as a second model generation unit. The first model generation unit 12e generates the detailed resistor model of an abnormal segmented region determined to be abnormal by the first determination unit 12d and the simplified resistor model of a normal segmented region determined to be normal by the first determination unit 12d. The second model generation unit 12e generates the detailed resistor model of an abnormal segmented region determined to be abnormal by the second determination unit 12d and the simplified resistor model of a normal segmented region determined to be normal by the second determination unit 12d.

Namely, the model generation unit 12e generates the detailed resistor model of an area that is the abnormal segmented region determined to be abnormal by at least one of the first determination unit and the second determination unit in the second embodiment. In addition, the model generation unit 12e generates the simplified resistor model of an area that is the normal segmented region determined to be normal by both of the first determination unit and the second determination unit.

At this time, the model generation unit 12e generates the resistor model of a cell layer in the abnormal segmented region in the detailed resistor model. In addition to this, the model generation unit 12e sets a consumption current value for each cell in the abnormal segmented region, and generates the resistor model of a wiring layer other than the cell layer in the abnormal segmented region.

In addition, in the simplified resistor model, the model generation unit 12e sets a substantially equal consumption voltage value, obtained by dividing the total consumption current value of the normal segmented region by the number of connection points, for an end point that is each connection point in a cell layer in the normal segmented region, and generates the resistor model of a wiring layer other than the cell layer in the normal segmented region. In addition, as a consumption current value set for each cell in the abnormal segmented region, a library value indicated from the outside or a value preliminarily stored in the cell consumption current value information storage unit 21b in the circuit information storage unit 21 is used. In addition, [the consumption current value of the target area] calculated in Expressions (7) and (8) is used as the total consumption current value of the normal segmented region.

Figure 8:
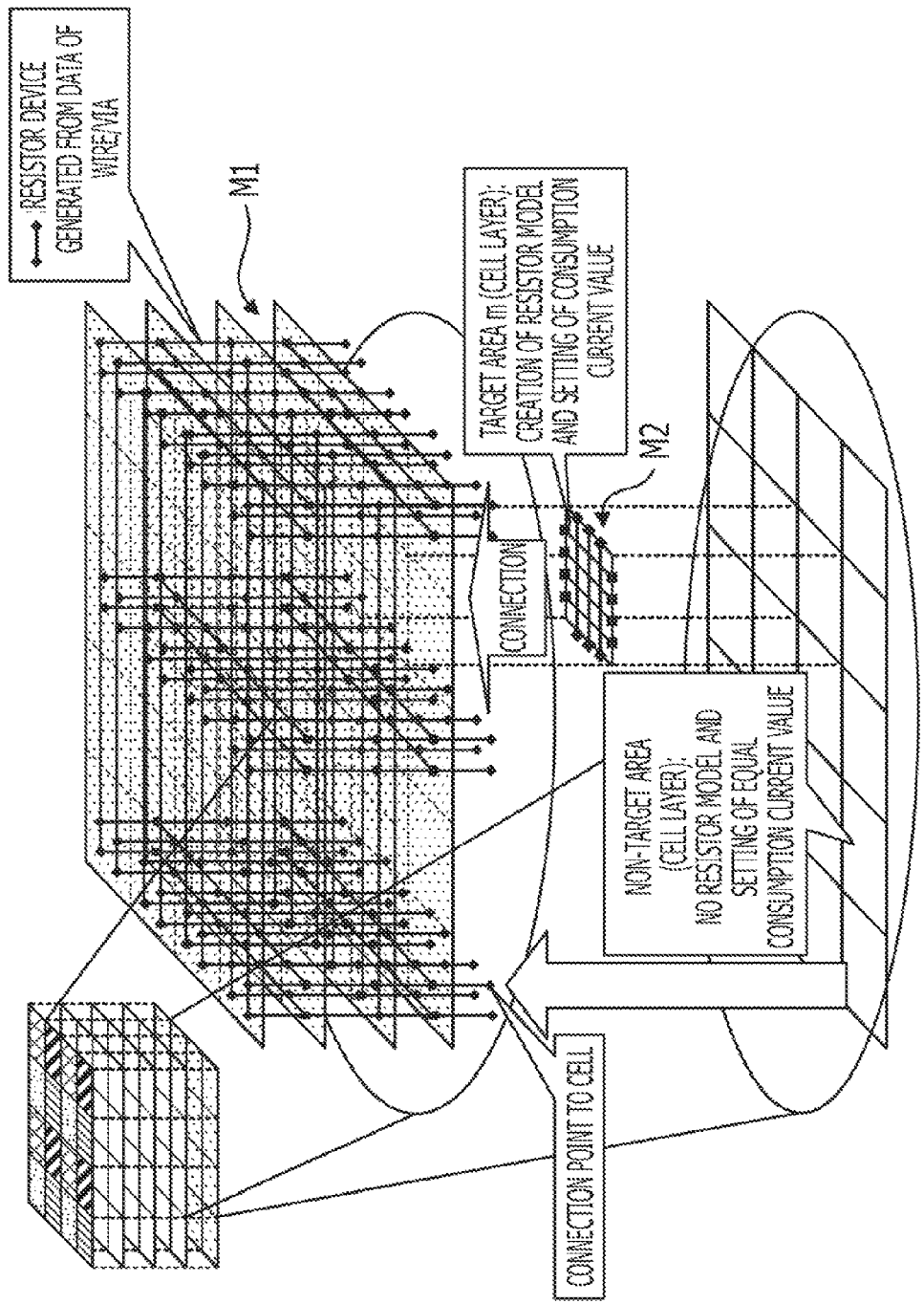
FIG. 8 is a diagram illustrating a model generation method according to the second embodiment.

To describe it in detail, while generating the detailed resistor model in the abnormal segmented region in the analysis target region, the model generation unit 12e generates the simplified resistor model in the normal segmented region in the analysis target region as illustrated in FIG. 8. In addition, FIG. 8 is a diagram illustrating a model generation method according to the second embodiment. In addition, in FIG. 8, it is assumed that the target area m is an abnormal segmented region determined to be abnormal by at least one of the first determination unit and the second determination unit.

The model generation unit 12e creates the following resistor model including the above-mentioned detailed resistor model and simplified resistor model, so as to minutely analyze the target area m that is an abnormal segmented region.

Namely, the model generation unit 12e converts power line wiring in the wiring layer other than the cell layer into a resistor model M1.

In addition, with respect to the cell layer in the target area m, the model generation unit 12e converts the power line wiring of the cell layer into a resistor model M2 which includes the inside of a cell. In addition to this, the model generation unit 12e connects the resistor model M2 and the resistor model M1 to each other and sets a consumption current value for each cell.

Furthermore, while not creating the resistor model of the inside of a cell for the cell in an area other than the target area m, namely, in the normal segmented region, the model generation unit 12e performs modeling processing in which a consumption current value is set for a connection point to the resistor model M1, in the normal segmented region. As the current value, the substantially equal consumption voltage value is set that is obtained by dividing the consumption current value in the corresponding area calculated in Expressions (7) and (8) by the number of connection points in the corresponding area as described above.

The power circuit analysis unit (first power circuit analysis unit/second power circuit analysis unit) 12f performs power circuit analysis on the resistor model generated by the model generation unit 12e. At this time, by analyzing the resistor model in which the abnormal segmented region is minutely modeled, the power circuit analysis unit 12f specifies a problematic position on a real circuit in the abnormal segmented region, that is, an abnormality occurrence position/error position. The analysis result based on the power circuit analysis unit 12f is stored in the analysis result storage unit 23 in the storage unit 20, and the CAD system 200 reflects the analysis result in the circuit information of the analysis target circuit.

Figure 9:
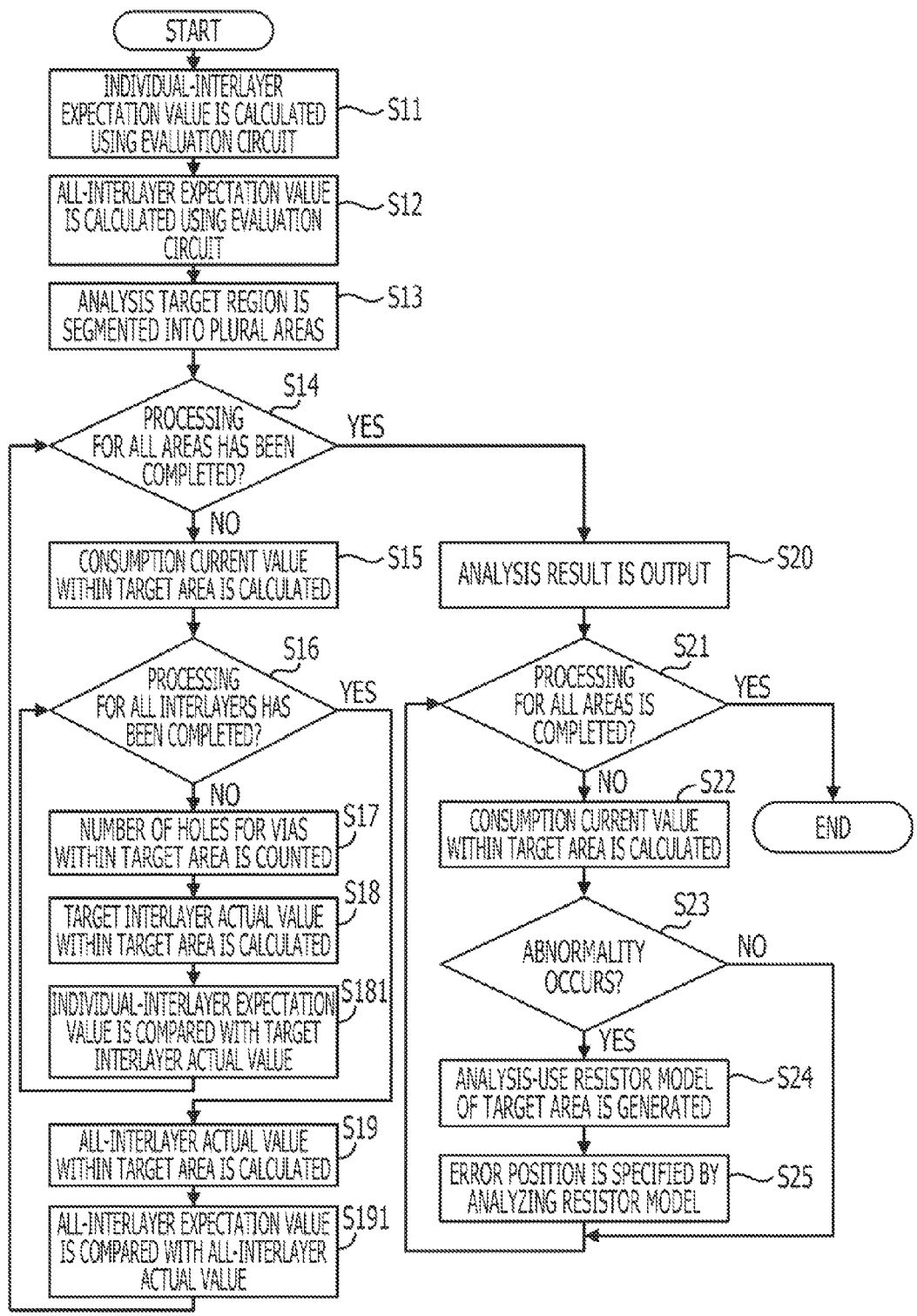
FIG. 9 is a flowchart illustrating an operation performed in a power circuit analysis apparatus according to the second embodiment.
Figure 10:
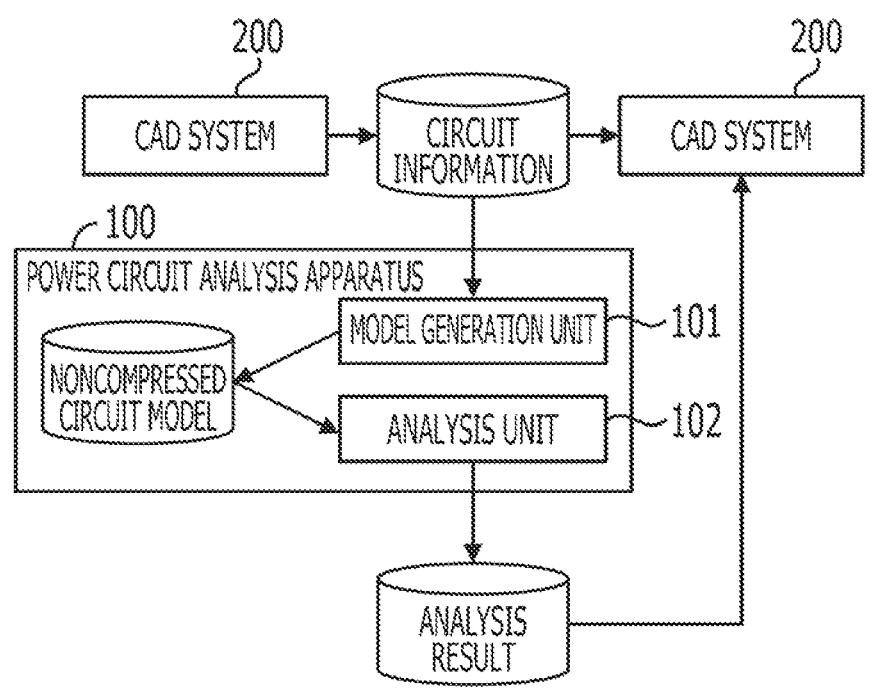
FIG. 10 is a block diagram illustrating an example of a configuration of a usual power circuit analysis apparatus.
Figure 11:
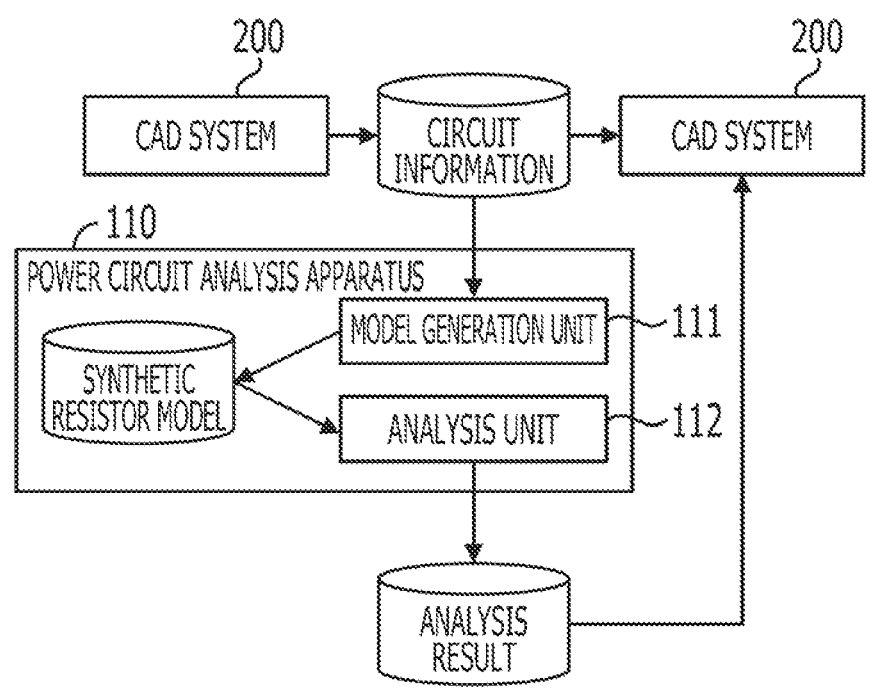
FIG. 11 is a block diagram illustrating another example of a configuration of a usual power circuit analysis apparatus.

[2-2] Operation Performed in Power Circuit Analysis Apparatus According to Second Embodiment Next, the function and the operation of the power circuit analysis apparatus 113 according to the second embodiment configured in such a way as described above will be described in accordance with a flowchart (Operations S11 to S25, S181, and S191) illustrated in FIG. 9. In addition, in FIG. 9, since the same operation number as that described above indicates the same or almost the same processing, the description thereof will be omitted.

[2-2-1] Comparison of Individual-Interlayer Expectation Value with Individual-Interlayer Actual Value within Target Area and Determination (Operation S181)

Operations S11 to S18 are executed in substantially the same way as in the first embodiment, and when [the actual value of the i-(i+1) interlayer] is calculated as the actual value of a target interlayer within the target area m on the basis of Expression (9-i) in Operation S18, the first determination unit 12d compares [the actual value of the i-(i+1) interlayer] with [the expectation value of the i-(i+1) interlayer] calculated in Operation S11. In addition, the first determination unit 12d performs abnormality/normality determination based on the above-mentioned determination Expressions (12-1) to (12-3). Namely, the first determination unit 12d determines that a segmented region of which individual-interlayer actual value is a value existing within a first specified range including the individual-interlayer expectation value is normal (refer to Expression (12-1)). On the other hand, the first determination unit 12d determines that a segmented region of which individual-interlayer actual value is a value existing beyond the first specified range is abnormal (refer to Expressions (12-2) and (12-3)).

By repeating the above-mentioned Operations S16 to S18 and S181, the actual value calculation unit 12b and the determination unit 12d calculate actual values with respect to all interlayers within the target area m. Every time calculated, a calculated actual value is compared with a corresponding interlayer expectation value, and abnormality/normality determination based on determination Expressions (12-1) to (12-3) is performed.

[2-2-2] Calculation of All-Interlayer Actual Value within Target Area (Operation S19)

When the above-mentioned processing operations in Operations S17, S18, and S181 are executed for all interlayers (YES route in Operation S16), the actual value calculation unit 12b calculates the number of holes for vias per unit consumption current value as the all-interlayer actual value in all interlayers in the target area m on the basis of the above-mentioned Expressions (10) and (11) in substantially the same way as in the first embodiment.

[2-2-3] Comparison of All-Interlayer Expectation Value with All-Interlayer Actual Value within Target Area and Determination (Operation S191)

When [the all-interlayer actual value of the target area m] is calculated in Operation S19, the second determination unit 12d compares [the all-interlayer actual value of the target area m] with [the all-interlayer expectation value] calculated in Operation S12. In addition, the second determination unit 12d determines that a segmented region of which all-interlayer actual value is a value existing within a second specified range including the all-interlayer expectation value is normal (refer to Expression (13-1)). On the other hand, the second determination unit 12d determines that a segmented region of which all-interlayer actual value is a value existing beyond the second specified range is abnormal (refer to Expressions (13-2) and (13-3)).

[2-2-4] Output of Analysis Result (Operation S20)

When the above-mentioned processing operations in Operations S15 to S19, S181, and S191 are executed for all interlayers (YES route in Operation S14), an analysis result based on the analysis unit 12 is output to the designer by the output unit 12c and the analysis result is stored as an analysis result in the analysis result storage unit 23. Here, examples of the analysis result output here include determination results obtained in Operations S181 and S191, namely, the results of abnormality/normality determination based on the determination unit 12d in each area, in addition to the individual-interlayer expectation value, the individual-interlayer actual value, the all-interlayer expectation value, the all-interlayer actual value, the count value of the number of holes for vias in each area, and the consumption current value in each area, calculated and acquired in the analysis unit 12 in such a way as described above.

[2-2-5] Determination of Completion of Processing for All Areas (Operation S21)

After the analysis results are output in Operation S20, the following processing operations in Operations S21 to S25 are executed by the model generation unit 12e or the power circuit analysis unit 12f in the processing unit 10 in the second embodiment.

First, in Operation S21, the model generation unit 12e determines whether or not the following Operations S22 to S25 have been executed for all areas segmented by the segmentation unit 11. When processing for all areas has not been executed (NO route in Operation S21), the model generation unit 12e selects, as a target area, one of unprocessed areas and executes the processing in the following Operations S22 to S25, for the target area. On the other hand, when processing for all areas has been executed (YES route in Operation S21), the processing unit 10 terminates the processing.

[2-2-6] Abnormality Check for Target Area (Operations S22 and S23)

By referring to the analysis result of the target area m in the analysis result storage unit 23, the model generation unit 12e determines whether or not the target area m is determined to be abnormal by the determination unit 12d in Operation S181 or S191. When the target area m is normal (NO route in Operation S23), the model generation unit 12e returns to the processing in Operation S21. On the other hand, when the determination unit 12d determines that the target area m is abnormal (YES route in Operation S23), the model generation unit 12e proceeds to the processing in Operation S24.

[2-2-7] Generation of Resistor Model (Operation S24)

As described with reference to FIG. 8, the model generation unit 12e generates the resistor model used for the power circuit analysis.

At this time, since the data amount of the power line wiring in the wiring layer other than the cell layer is extremely small compared with a data amount in the cell layer, the model generation unit 12e converts the whole power line wiring in the wiring layer other than the cell layer into a resistor model, regardless of the normality/abnormality of the area.

On the other hand, since the cell layer in the lowermost layer has a complex structure, the amount of processing becomes large if the whole cell layer is converted into a resistor model. Therefore, the model generation unit 12e extracts a portion, namely, an abnormal segmented region (target area m) to be minutely analyzed, and the model generation unit 12e converts the area thereof into a detailed resistor model. In addition, with respect to a region other than the abnormal segmented region, namely, a cell layer in an area other than the target area m, the model generation unit 12e performs the above-mentioned simplified resistor modeling in which a substantially equal consumption voltage value is set for a connection point to the outside in each segmented region.

[2-2-8] Specification of Error Position Based on Power Circuit Analysis (Operation S25)

By analyzing the resistor model in which the abnormal segmented region is minutely modeled by the model generation unit 12e, the power circuit analysis unit 12f specifies a problematic position on a real circuit in the abnormal segmented region, that is, an abnormality occurrence position/error position. In addition, the analysis result based on the power circuit analysis unit 12f is stored in the analysis result storage unit 23 in the storage unit 20, and the CAD system 200 reflects the analysis result in the circuit information of the analysis target circuit. After the error position is specified in such a way, the processing unit 10 returns to the processing in Operation S21.

[2-3] Advantageous Effect of Power Circuit Analysis Apparatus According to Second Embodiment According to the power circuit analysis apparatus 1B of the second embodiment, the following function effect is also obtained in addition to substantially the same function effect as that of the first embodiment.

In the second embodiment, an area including a problematic position/error position is extracted, as an abnormal segmented region, by the determination unit 12d, a detailed resistor model is generated by the model generation unit 12e with respect to the abnormal segmented region, and the power circuit analysis is performed on the basis of the generated resistor model. Namely, by generating the resistor model that focuses on the problematic position in the abnormal segmented region, the power circuit analysis is performed. Accordingly, the power circuit analysis for the analysis target circuit is performed at high speed with a small amount of memory utilization and a high degree of accuracy.

[3] Other

Although preferred embodiments of the present invention have been described so far, the present invention is not limited to such specific embodiments, and it should be understood that the various modifications and alterations could be made hereto without departing from the scope of the present invention.

In addition, in the above-mentioned embodiments, a case has been described in which both a function for utilizing the expectation value and the actual value of each interlayer (refer to a configuration element to which "first" is assigned) and a function for utilizing the expectation value and the actual value of all interlayers (refer to a configuration element to which "second" is assigned) are provided. However, the present invention is not limited to such a case, and a function relating to the expectation value and the actual value of each interlayer may be provided, or a function relating to the expectation value and the actual value of all interlayers may be provided. In addition, in any of these cases, substantially the same advantageous effect as that in the above-mentioned embodiment is obtained.

In addition, a computer (a CPU, an information processing apparatus, and various kinds of terminals are included therein) executes a specified application program (a power circuit analysis program), thereby realizing all or a part of functions as the segmentation unit 11, the analysis unit 12A (the expectation value calculation unit 12a, the actual value calculation unit 12b, and the output unit 12c), and the analysis unit 12B (the expectation value calculation unit 12a, the actual value calculation unit 12b, the output unit 12c, the determination unit 12d, the model generation unit 12e, and the power circuit analysis unit 12f), described above.

For example, the program is provided in a form in which the program is recorded in a computer-readable recording medium such as a flexible disk, a CD (a CD-ROM, a CD-R, a CD-RW, or the like), a DVD (a DVD-ROM, a DVD-RAM, a DVD-R, a DVD-RW, a DVD+R, a DVD+RW, a Blu-ray®, or the like), or the like. In this case, the computer reads the program from the recording medium and transfers and stores the program to and in an internal storage apparatus or an external storage apparatus to utilize the program.

Here, the term "computer" is a concept including hardware and an Operating System (OS), and means hardware operating under the control of the OS. In addition, when the OS is unnecessary and an application program by itself causes the hardware to operate, the hardware itself corresponds to the computer. The hardware includes at least a microprocessor such as a CPU or the like and a mechanism for reading a computer program recorded in the recording medium. The power circuit analysis program includes a program code causing such a computer as described above to realize the functions of the segmentation unit 11 and the analysis units 12A and 12B. In addition, a part of the functions may not be realized by the application program, but by the OS.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A power circuit analysis apparatus comprising:
a memory; and
a processor configured to:
segment an analysis target region in a power circuit included in an analysis target circuit into a plurality of segmented regions,
output an analysis result of the power circuit with respect to each of the plurality of segmented regions on a basis of a consumption current value in the segmented region and a number of via holes formed in each interlayer connecting power line wirings in upper and lower layers to each other in the segmented region,
output an expectation value of the number of via holes per unit consumption current value in each interlayer in the analysis target circuit as an individual-interlayer expectation value, and
output the number of via holes per unit consumption current value in each interlayer in the analysis target circuit as an individual-interlayer actual value with respect to each of the plurality of segmented regions.

2. The power circuit analysis apparatus according to claim 1, wherein the processor is further configured to segment the analysis target region into the plurality of segmented regions on a basis of a bump area that is a unit region used for supplying power in the analysis target circuit.

3. The power circuit analysis apparatus according to claim 1, wherein the processor is further configured to involve an influencing area that is adjacent to and electrically influences the boundary of the segmented region in each of the plurality of segmented regions.

4. The power circuit analysis apparatus according to claim 1, wherein the processor is further configured to calculate the number of via holes per unit consumption current value in each interlayer in an evaluation circuit as the individual-interlayer expectation value, and the evaluation circuit is manufactured prior to designing of the analysis target circuit.

5. The power circuit analysis apparatus according to claim 1, wherein the processor is further configured to output the calculated individual-interlayer expectation value and the calculated individual-interlayer actual value calculated with respect to each of the plurality of segmented regions.

6. The power circuit analysis apparatus according to claim 1, wherein the processor is further configured to output comparison results obtained by comparing a calculated individual-interlayer expectation value and a calculated individual-interlayer actual value with respect to each of the plurality of segmented regions, respectively.

7. The power circuit analysis apparatus according to claim 6, wherein the processor is further configured to:
determine that a segmented region of which individual-interlayer actual value is a value existing within a first specified range including the individual-interlayer expectation value is normal,
determine that a segmented region of which individual-interlayer actual value is a value existing beyond the first specified range is abnormal, and
output a determined result indicating whether the segmented region of which individual-interlayer actual value is normal or abnormal.

8. The power circuit analysis apparatus according to claim 7, wherein the processor is further configured to:
generate a resistor model of an abnormal segmented region determined to be abnormal and a resistor model of a normal segmented region determined to be normal; and output an analysis result obtained by analyzing the generated resistor model of the abnormal segmented region or the generated resistor model of the normal segmented region.

9. The power circuit analysis apparatus according to claim 8, wherein the processor is further configured to:
  generate a resistor model of a cell layer included in the abnormal segmented region,
  set a consumption current value for each cell included in the abnormal segmented region,
  generate a resistor model of a wiring layer other than the cell layer included in the abnormal segmented region in the resistor model of the abnormal segmented region determined to be abnormal,
  set a substantially equal consumption voltage value obtained by dividing a total consumption current value of the normal segmented region by the number of connection points for each of the connection points in a cell layer included in the normal segmented region, and
  generate a resistor model of a wiring layer other than the cell layer included in the normal segmented region in the resistor model of the normal segmented region determined to be normal.

10. The power circuit analysis apparatus according to claim 1, wherein the processor is further configured to:
  calculate an expectation value of the number of via holes per unit consumption current value in all interlayers as an all-interlayer expectation value in the analysis target circuit; and
  calculate the number of via holes per unit consumption current value in all interlayers as an all-interlayer actual value in the analysis target circuit with respect to each of the plurality of segmented regions.

11. The power circuit analysis apparatus according to claim 10, wherein the processor is further configured to calculate the number of via holes per unit consumption current value in all interlayers as the all-interlayer expectation value in an evaluation circuit manufactured prior to designing of the analysis target circuit.

12. The power circuit analysis apparatus according to claim 10, wherein the processor is further configured to output the calculated all-interlayer expectation value and the calculated all-interlayer actual value with respect to each of the plurality of segmented regions.

13. The power circuit analysis apparatus according to claim 10, wherein the processor is further configured to output a comparison result obtained by comparing a calculated all-interlayer expectation value and a calculated all-interlayer actual value with respect to each of the plurality of segmented regions.

14. The power circuit analysis apparatus according to claim 13, wherein the processor is further configured to:
  determine that a segmented region of which all-interlayer actual value is a value existing within a second specified range including the all-interlayer expectation value is normal,
  determine that a segmented region of which all-interlayer actual value is a value existing beyond the second specified range is abnormal, and
  output a determined result indicating whether the segmented region of which all-interlayer actual value is normal or abnormal.

15. The power circuit analysis apparatus according to claim 14, wherein the processor is further configured to:
  generate a resistor model of an abnormal segmented region determined to be abnormal and a resistor model of a normal segmented region determined to be normal; and
  output an analysis result obtained by analyzing the generated resistor model of the abnormal segmented region or the generated resistor model of the normal segmented region.

16. The power circuit analysis apparatus according to claim 15, wherein the processor is further configured to:
  generate a resistor model of a cell layer included in the abnormal segmented region, sets a consumption current value for each cell included in the abnormal segmented region,
  generate a resistor model of a wiring layer other than the cell layer included in the abnormal segmented region in the resistor model of the abnormal segmented region determined to be abnormal,
  set a substantially equal consumption voltage value obtained by dividing a total consumption current value of the normal segmented region by the number of connection points for each of the connection points in a cell layer included in the normal segmented region, and
  generate a resistor model of a wiring layer other than the cell layer included in the normal segmented region in the resistor model of the normal segmented region determined to be normal.

17. A non-transitory computer-readable medium storing a power circuit analysis program causing a computer to execute a process, the process comprising:
  segmenting an analysis target region in a power circuit included in an analysis target circuit into a plurality of segmented regions; and
  outputting an analysis result of the power circuit with respect to each of the plurality of segmented regions on a basis of a consumption current value in the segmented region and a number of via holes formed in each interlayer connecting power line wirings in upper and lower layers to each other in the segmented region,
  the outputting includes
    outputting an expectation value of the number of via holes per unit consumption current value in each interlayer in the analysis target circuit as an individual-interlayer expectation value, and
    outputting the number of via holes per unit consumption current value in each interlayer in the analysis target circuit as an individual-interlayer actual value with respect to each of the plurality of segmented region.

18. A power circuit analysis method for a computer, the method comprising:
  segmenting, by using a processor of the computer, an analysis target region in a power circuit included in an analysis target circuit into a plurality of segmented regions;
  outputting an expectation value of number of via holes per unit consumption current value in each interlayer in the analysis target circuit as an individual-interlayer expectation value with respect to each of the plurality of segmented regions;
  outputting number of via holes per unit consumption current value in each interlayer in the analysis target circuit as an individual-interlayer actual value with respect to each of the plurality of segmented regions; and
  outputting an analysis result of the power circuit with respect to each of the plurality of segmented regions on a basis of the individual-interlayer expectation value and the individual-interlayer actual value.

* * * * *